United States Patent
Katcha

(10) Patent No.: US 12,034,301 B2
(45) Date of Patent: Jul. 9, 2024

(54) MULTI-WAY POWER CONTROLLER AND RELATED METHODS

(71) Applicant: Present Power Systems, LLC, Cedarburg, WI (US)

(72) Inventor: Jason Stuart Katcha, Cedarburg, WI (US)

(73) Assignee: Unico, LLC, Franksville, WI (US)

( * ) Notice: Subject to any disclaimer, the term of this patent is extended or adjusted under 35 U.S.C. 154(b) by 0 days.

(21) Appl. No.: 17/862,363

(22) Filed: Jul. 11, 2022

(65) Prior Publication Data

US 2023/0012882 A1      Jan. 19, 2023

Related U.S. Application Data

(60) Provisional application No. 63/259,393, filed on Jul. 9, 2021.

(51) Int. Cl.
| | |
|---|---|
| H02J 3/46 | (2006.01) |
| H02J 3/00 | (2006.01) |
| H02J 3/32 | (2006.01) |
| H02J 3/38 | (2006.01) |
| H02M 3/158 | (2006.01) |
| H02M 7/483 | (2007.01) |
| H02M 7/537 | (2006.01) |

(52) U.S. Cl.
CPC .............. *H02J 3/007* (2020.01); *H02J 3/32* (2013.01); *H02J 3/381* (2013.01); *H02M 3/158* (2013.01); *H02M 7/483* (2013.01); *H02M 7/537* (2013.01); *H02J 2300/26* (2020.01); *H02J 2300/28* (2020.01)

(58) Field of Classification Search
None
See application file for complete search history.

(56) References Cited

U.S. PATENT DOCUMENTS

| | | |
|---|---|---|
| 7,465,872 B1 | 12/2008 | De Rooij |
| 8,023,295 B1 | 9/2011 | Shekhawat |
| | (Continued) | |

FOREIGN PATENT DOCUMENTS

| | | |
|---|---|---|
| EP | 1531542 | 5/2005 |
| EP | 2256894 | 12/2010 |
| | (Continued) | |

*Primary Examiner* — Jared Fureman
*Assistant Examiner* — Esayas G Yeshaw
(74) *Attorney, Agent, or Firm* — Fitch, Even, Tabin & Flannery LLP

(57) ABSTRACT

A power converter including a three-input direct current converter capable of performing maximum power point tracking on three power inputs, a step down converter capable of voltage step down of the three power inputs, a bus capacitor and a balance circuit utilizing switches and transformers utilized to balance voltages of the bus capacitor, a three-level inverter capable of creating alternating current voltages for the alternating current grid, an output filter electrically coupled to the three-level inverter, a contactor capable of disconnecting the bus capacitor and the balance circuit from the alternating current grid, and a parameter sensor and a field programmable gate array controller electrically coupled to the power converter, capable of controlling a plurality of power switches based on at least one sensed parameters.

18 Claims, 2 Drawing Sheets

(56) References Cited

U.S. PATENT DOCUMENTS

| | | | |
|---|---|---|---|
| 9,148,016 B2 | 9/2015 | Kaufman | |
| 9,665,672 B2* | 5/2017 | Dufour | G06F 30/367 |
| 10,074,981 B2* | 9/2018 | Faley | H02J 3/381 |
| 2009/0302686 A1 | 12/2009 | Fishman | |
| 2013/0027979 A1 | 1/2013 | Phadke | |
| 2013/0057200 A1* | 3/2013 | Potts | H02J 50/12 |
| | | | 320/107 |
| 2014/0062198 A1 | 3/2014 | Luo | |
| 2014/0078791 A1 | 3/2014 | Gurudasani | |
| 2014/0241016 A1* | 8/2014 | Ho | H02M 7/493 |
| | | | 363/40 |
| 2014/0375131 A1 | 12/2014 | Spanoche | |
| 2015/0078049 A1 | 3/2015 | Yoo | |
| 2015/0288188 A1 | 10/2015 | Keshner | |
| 2016/0344188 A1 | 11/2016 | Carlson | |
| 2017/0047742 A1* | 2/2017 | Narla | H02J 3/381 |
| 2017/0133879 A1 | 5/2017 | Eckhardt | |
| 2018/0054064 A1* | 2/2018 | Narla | H02J 9/061 |
| 2019/0390619 A1* | 12/2019 | Janik | F02D 41/0027 |
| 2020/0279707 A1* | 9/2020 | Grossberg | H02H 9/04 |
| 2021/0211066 A1* | 7/2021 | Vavilpalli | H02J 3/48 |
| 2022/0006299 A1* | 1/2022 | Zhang | H02J 3/34 |
| 2022/0302713 A1* | 9/2022 | Wang | H02M 3/156 |
| 2023/0187930 A1* | 6/2023 | Reimann | H02J 1/084 |
| | | | 363/65 |

FOREIGN PATENT DOCUMENTS

| | | |
|---|---|---|
| EP | 2701264 | 2/2014 |
| WO | 2013127230 | 9/2013 |
| WO | 2014203561 | 12/2014 |

\* cited by examiner

MULTI-WAY POWER CONTROLLER AND RELATED METHODS

CROSS-REFERENCE TO RELATED APPLICATIONS

This application claims benefit of U.S. Provisional Application No. 63/259,393, filed Jul. 9, 2021, which is hereby incorporated herein by reference in its entirety.

FIELD OF THE INVENTION

This disclosure generally relates to power converters used in a residence to utilize solar and/or wind power, store power in a battery, deliver power to and from the AC grid, and provide emergency back-up power when the AC grid is not operating, and methods relating to same.

BACKGROUND OF THE INVENTION

Power converters may be used to store power and provide emergency back-up power. Accordingly, it has been determined that the need exists for an improved power converter and method relating to same to provide capabilities, features, and functions, not available in current devices.

Figure 1:
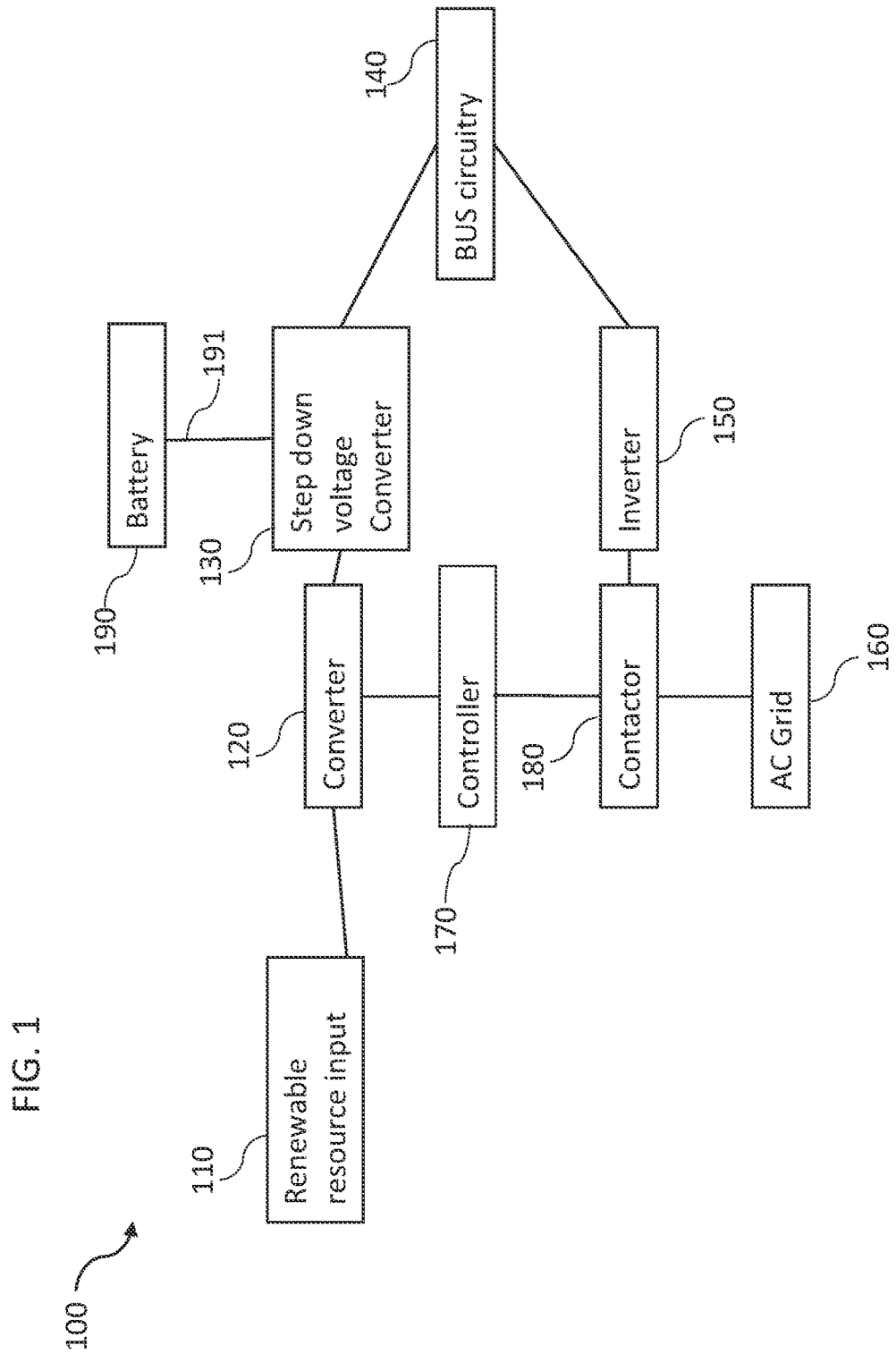
FIG. 1 is a block diagram for a power controller in accordance with one embodiment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a power controller and associated method for power conversion is provided. In one form, a multi-way power controller is provided, also referred to as a multi-way power converter, and may include multiple power inputs from renewable power sources, such as wind, solar, etc. In a preferred form and as shown in the box diagram of FIG. 1, the circuit 100 includes renewable resource inputs 110 which are connected to a converter 120, such as a multi-input DC-DC converter, which can perform Maximum Power Point Tracking on a plurality of inputs (e.g., on three separate renewable power inputs). The circuit 100 further includes a step-down voltage converter 130 that can step-down voltage from the multiple renewable power inputs. Bus circuitry 140 is provided to balance the voltage of the bus circuitry to pull energy from one area and place it in another and vice versa to balance the circuit 100. In one form, the bus circuitry 140 includes a plurality of capacitors and a balance circuit that can balance the voltages of the capacitors by using switches and one or more transformers to pull energy from one capacitor to put it in the other and vice versa. The circuit also includes an inverter 150, e.g., a multi-level inverter such as a three-level inverter in circuits dealing with three renewable resource inputs, etc. to create AC voltage and currents for an AC grid 160 or AC loads in general. In a preferred form, the circuit 100 will further include a controller 170 and contactor 180 to allow the circuit 100 to disconnect from the AC grid 160 when desired. In some forms, the controller 170 may include parameter sensors and a field programmable gate array (FPGA) that can control all power switches based on algorithms and sensed parameters. The circuit 100 may also include a battery 190 connected, for example, via a DC-DC converter and DC Bus 191.

Figure 2:
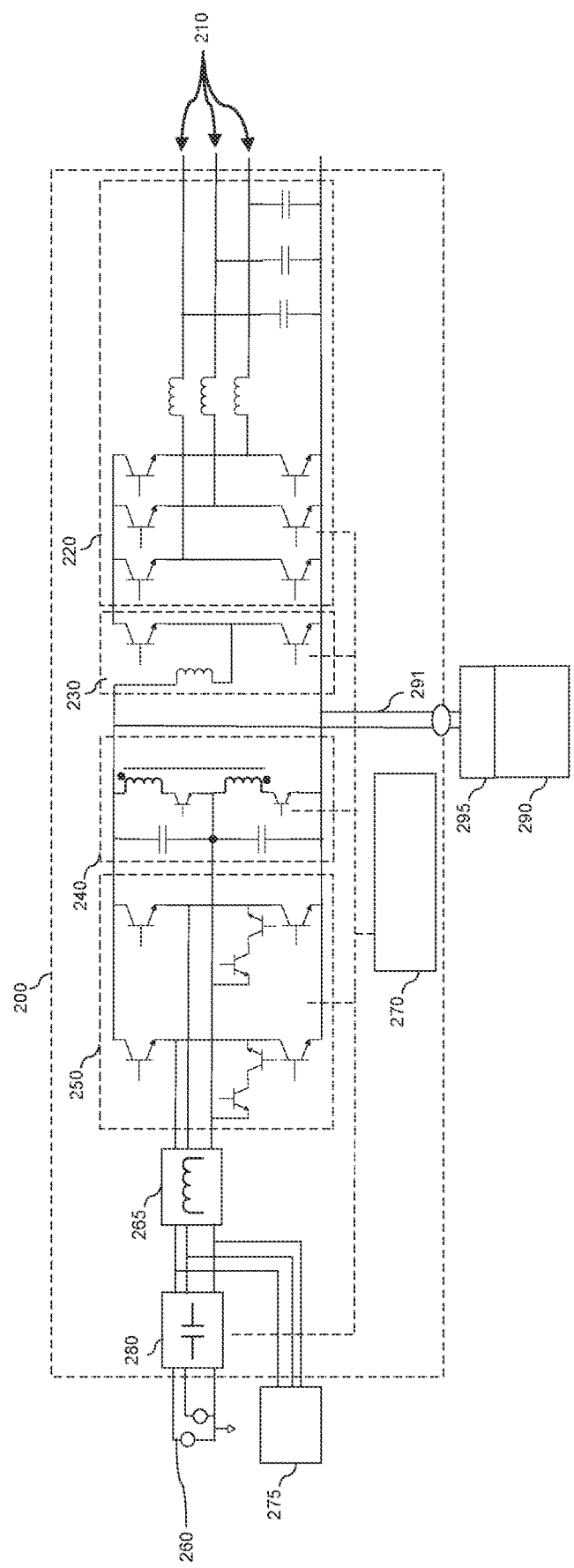
FIG. 2 is a circuit diagram of a power controller in accordance with one embodiment.

Turning now to FIG. 2, which is a representative example of a circuit in accordance with FIG. 1. In this example, a three-way power system 200 is contemplated (e.g., three-way renewable energy resource, three-way power controller/converter, etc.). The three-way power converter 200 includes a three-input direct current to direct current (DCDC) converter 220, a buck DCDC converter 230, bus capacitors and balance circuits 240, a three-level inverter 250, an output filter 265, a contactor 280, and a parameter sensor and field programmable gate array (FPGA) controller 270. For convenience, items which are similar to those discussed above with respect to FIG. 1 will use the same latter two-digit reference numeral, but have the prefix "2" instead of "1" to distinguish embodiments from one another.

As described herein, a power converter 200 is provided. The power converter 200 converts the power from power supply and/or inputs to usable power. The power supply includes three power inputs 210 which may come from renewable sources, such as wind or solar. The power converter 200 described herein may be used as a filtering or converting circuit to utilize renewable energy sources generated at a residence, such as a house. These teachings may additionally or alternatively be used to store power generated by wind or solar in a battery for later use, to deliver power generated by wind and solar sources to and from the AC grid 260, and finally, in situations where the AC grid 260 is down, provide back-up power. The three-way power controller 200 may be used to adjust the power received from the three power inputs 210 to provide the benefits and advantages herein. The three-way power controller 200 may additionally or alternatively be used to allow for a user to decide between outputting AC to or from the AC grid 260 or AC loads 275, and outputting DC to a battery 290.

With respect to FIG. 2, a three-way power controller 200 is provided. The three way power controller 200 includes a three-input DCDC converter 220. The three-input DCDC converter 220 may be used to reduce any noise from the three power inputs 210. This may be done to convert the DC voltage from the three power inputs 210 to a second DC voltage to be used by the three-way power controller 200. The three-input DCDC converter 220 is capable of performing maximum power point tracking (MPPT) on up to three power inputs 210 electrically coupled to the three-input DCDC converter 220. The three power inputs 210, for example, may be three separate renewable source power inputs such as solar and/or wind power inputs.

The three-way power controller may further include a Buck DCDC converter 230. The Buck DCDC converter 230 is capable of stepping down voltage output from the three-input DCDC converter 220. This allows for the three-way power controller 200 to utilize an appropriate voltage throughout the system. The Buck DCDC converter 230 is electrically coupled to the three-input DCDC converter 220. The Buck DCDC converter 230 outputs the voltage to a bus capacitor and balance circuit 240. In some embodiments, the Buck DCDC converter 230 outputs the voltage to a DC bus connection 291, which in turns goes to a DCDC converter 295 and to a battery 290 to be used at a later time.

The three-way power controller 200 additionally includes at least one bus capacitor and a balance circuit 240. The at least one bus capacitors and the balance circuit 240 may be utilized to balance the voltages of the bus capacitors by utilizing switches and a transformer to pull energy from one capacitor put into the other and vice versa. The at least one bus capacitors and the balance circuit 240 are electrically coupled to the Buck DCDC converter 230. Additionally, the at least one bus capacitors and the balance circuit 240 may help balance the voltages on the bus capacitor that may have an imbalance due to a non-linear AC load 275, or an imbalance in the two phases of the AC grid 260.

The three-way power controller 200 additionally includes a three-level inverter 250. The three-level inverter 250 may be utilized to create an alternating current (AC) voltage and currents for an AC grid 260 or an AC load 275. The three-level inverter 250 is electrically coupled to the at least one bus capacitors and the balance circuit 240.

The three-way power controller additionally includes an output filter 265 and a contactor 280. The output filter 265 and the contactor 280 may be utilized to filter the voltage from the three-level inverter 250 and disconnect the three-way power converter 200 from the AC grid 260 and/or an AC load 275. The output filter 265 and the contactor 280 are electrically coupled to one another. The output filter 265 and the contactor 280 are electrically coupled to the three-level inverter 250 and any attached AC grid 260 and/or AC load 275.

The three-way power controller additionally includes a parameter sensor and FPGA controller 270. The parameter sensor and FPGA controller 270 may be utilized to control any associated switches used within the three-way power controller 200 based on algorithms and sensed parameters. The parameter sensor and FPGA controller 270 are electrically coupled to three-input DCDC converter 220, the Buck DCDC converter 230, the bus capacitor and the balance circuit 240, the three-level inverter 250, and the contactor 280.

The three-way power controller additionally includes a DC bus connection 291. The DC bus connection 291 may connect the three-way power controller 200 to a DCDC converter 295 and/or a battery 290 for storing the associated energy from the three power inputs 210. This provides a back-up energy storage for a user if the AC grid 260 is down.

The associated switches illustrated in the circuit diagram of FIG. 2, with reference to the three-input DCDC converter 220, The Buck DCDC converter 230, the at least one bus capacitors and the balance circuit 240, and the three-level inverter 250, may be BJT, IGBT, Mosfet, Silicon-Carbide Mosfet, and each may contain an anti-parallel diode.

The parameter sensor and FPGA controller 270 may use at least one real-time digital circuit simulator capable of controlling a switch state of the bus capacitor and the balance circuit 240 based on at least one simulation from the at least one real-time digital circuit simulator. The parameter sensor and FPGA controller 270 may additionally or alternatively control MPPT for the three power inputs 210. The parameter sensor and FPGA controller 270 additionally or alternatively performs various gird control algorithms such as anti-islanding, and other grid services.

The three-input DCDC converter 220 may include a capacitor and inductor associated with each power input. The three-input DCDC converter 220 may also include at least one diode for each of the three power inputs 210. The at least one diode for each of the three power inputs may be in series. The three-input DCDC converter 220 may utilize a boundary condition mode control to minimize switching losses.

The Buck DCDC converter 230 is in series with the three-input DCDC converter 220. The Buck DCDC converter 230 include two diodes in series with an inductor. The DC bus connection 291, include the DCDC converter 295 and battery 290 are connected to the three-way power controller 200 between the Buck DCDC converter 230 and the bus capacitor and balance circuit 240.

The bus capacitor and balance circuit 240 comprises two transformer-diode elements in series with one another. The bus capacitor and balance circuit 240 includes a node between the transformer-diode elements connecting two separate capacitors, in series with one another.

The three-level inverter 250 includes two diodes in parallel with the two capacitors of the bus capacitor and balance circuit 240. Two additional diodes are electrically coupled to the node created between the transformer-diode elements of the bus capacitor and balance circuit 240. These two additional diodes are coupled to the two diodes in parallel. This structure may be repeated, as shown in FIG. 2, such that there are two repeated circuit segments that are identical to one another in the three-level inverter.

The output filter 265 comprises an inductor to filter the voltage from the three-level inverter 250. The contactor 280 includes a capacitor to connect and/or disconnect the three-way power controller 200 to the AC grid 260 and/or an AC load 275.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A power converter comprising:
   a 3-level inverter having an input connected to a DC bus and an inverter output to be connected to a split-phase AC utility grid, the 3-level inverter operable to convert DC voltage of the DC bus to split-phase AC voltage to deliver power to a split-phase AC utility grid,
   the inverter output of the 3-level inverter having a first output, a second output, and a third output, the first output to be electrically connected to a first phase of the split-phase AC utility grid, the second output to be electrically connected to a second phase of the split-phase AC utility grid, and the third output to be electrically connected to a neutral conductor of the split-phase AC utility grid; and
   the 3-level inverter including:
      a first set of switches connected in series between a first bus of the DC bus and a second bus of the DC bus, a mid-point of the series of the first set of switches connected to the first output, the first set of switches operable to connect the first output to either the first bus or the second bus;
      a second set of switches connected in series between the first bus of the DC bus and a second bus of the DC bus, a mid-point of the series of the first set of switches connected to the second output, the second set of switches operable to connect the second output to either the first bus or the second bus;
a third set of switches connected in series between the first output and the third output, the third set of switches operable to connect the first output to the third output; and
a fourth set of switches connected in series between the second output and the third output, the fourth set of switches operable to connect the second output to the third output.

2. The power converter of claim 1 further comprising:
at least two bus capacitors electrically coupled to the input of the 3-level inverter, the at least two bus capacitors including a first capacitor electrically connected between the third output and the first bus of the DC bus and a second capacitor electrically connected between the third output and the second bus of the DC bus; and
at least one inductor and at least one power switch connected to the third output to balance a voltage on the at least two bus capacitors.

3. The power converter of claim 1 wherein the third set of switches includes a first switch and a second switch, the first switch having an opposite orientation relative to the second switch; and
wherein the fourth set of switches includes a third switch and a fourth switch, the third switch having an opposite orientation relative to the fourth switch.

4. The power converter of claim 3 wherein the first set of switches have the same orientation relative to one another; and
wherein the second set of switches have the same orientation relative to one another.

5. A power converter comprising:
a multi-input direct current converter capable of performing maximum power point tracking on multiple power inputs;
a step down converter electrically coupled to the multi-input direct current converter capable of voltage step down of the multiple power inputs;
a bus capacitor and a balance circuit utilizing switches and transformers electrically coupled to the step down converter utilized to balance voltages of the bus capacitor;
a multi-level inverter electrically coupled to the bus capacitor, the balance circuit, and an alternating current grid, capable of creating alternating current voltages for the alternating current grid;
an output filter electrically coupled to the multi-level inverter;
a contactor electrically coupled to the output filter and the alternating current grid capable of disconnecting the bus capacitor and the balance circuit from the alternating current grid; and
a parameter sensor and a field programmable gate array controller electrically coupled to the multi-input direct current converter, the step down converter, the bus capacitor and the balance circuit, the multi-level inverter, and the contactor, capable of controlling a plurality of power switches based on at least one sensed parameters.

6. The power converter of claim 5, wherein a direct current bus is made to the power converter, wherein the direct current bus is connected to a battery direct current to direct current converter and a battery.

7. The power converter of claim 5, wherein the field programmable gate array controller is capable of using at least one real-time digital circuit simulator capable of controlling a switch state of the bus capacitor and the balance circuit based on at least one simulation from the at least one real-time digital circuit simulator.

8. The power converter of claim 5, wherein the field programmable gate array controller is capable of performing anti-islanding grid control algorithms.

9. The power converter of claim 5, wherein the multi-input direct current converter utilizes a boundary condition mode control to minimize at least one switching loss.

10. The power converter of claim 5, wherein the bus capacitor and the balance circuit balance voltages on the bus capacitor having an imbalance due to a non-linear alternating current load and/or an imbalance in the two phases of the alternating current grid.

11. The power converter of claim 5, wherein the multi-input current converter comprises a three-input current converter.

12. The power converter of claim 5, wherein the multi-level inverter comprises a three-level inverter.

13. A method for utilizing power from three power inputs, the method comprising: performing maximum power point tracking the three power inputs utilizing a three-input direct current converter;
stepping down a voltage of the three power inputs utilizing a step down converter electrically coupled to the three-input direct current converter;
balancing voltages of a bus capacitor utilizing switches and transformers electrically coupled to the bus capacitor and a balance circuit, wherein the bus capacitor and the balance circuit are electrically coupled to the step down converter;
creating alternating current voltages for an alternating current grid utilizing a three-level inverter electrically coupled to the bus capacitor, the balance circuit, and the alternating current grid;
filtering the alternating current voltages utilizing an output filter electrically coupled to the three-level inverter;
disconnecting the bus capacitor and the balance circuit from the alternating current grid utilizing a contactor electrically coupled to the output filter and the alternating current grid; and
controlling a plurality of power switches based on at least one sensed parameters from a parameter sensor and a field programmable gate array controller electrically coupled to three-input direct current converter, the step down converter, the bus capacitor and the balance circuit, the three-level inverter, and the contactor.

14. The method of claim 13, wherein a direct current bus is made to the power converter, wherein the direct current bus is connected to a battery direct current to direct current converter and a battery.

15. The method of claim 13, wherein the field programmable gate array controller is capable of using at least one real-time digital circuit simulator capable of controlling a switch state of the bus capacitor and the balance circuit based on at least one simulation from the at least one real-time digital circuit simulator.

16. The method of claim 13, wherein the field programmable gate array controller is capable of performing anti-islanding grid control algorithms.

17. The method of claim 13, wherein the three-input direct current converter utilizes a boundary condition mode control to minimize at least one switching loss.

18. The method of claim 13, wherein the bus capacitor and the balance circuit balance voltages on the bus capacitor having an imbalance due to a non-linear alternating current load and/or an imbalance in the two phases of the alternating current grid.

* * * * *